United States Patent [19]

Griffin

[11] Patent Number: 4,598,291
[45] Date of Patent: Jul. 1, 1986

[54] ELECTRICAL CONTROL TELEMETERING DEVICE

[75] Inventor: James L. Griffin, Carpentersville, Ill.

[73] Assignee: Illinois Tool Works Inc., Chicago, Ill.

[21] Appl. No.: 607,380

[22] Filed: May 7, 1984

[51] Int. Cl.$^4$ .............................................. G08C 19/10
[52] U.S. Cl. .................................. 340/870.37; 340/709
[58] Field of Search ................... 340/870.37, 709, 710, 340/706; 364/190; 318/628; 331/65

[56] References Cited

U.S. PATENT DOCUMENTS 4,181,952  1/1980  Casey et al. ..................... 340/709 X
4,531,080  7/1985  Nordstrom et al. ............. 364/190 X Primary Examiner—Jerry W. Myracle
Attorney, Agent, or Firm—Donald D. Mondul; Thomas W. Buckman

[57] ABSTRACT

An electrical control device having a transducer for producing a plurality of indicating signals proportional to actual components of a force applied to that transducer by an actuator, which actuator has a capacitance relative to electrical ground. The control device further includes a processor for receiving the plurality of indicating signals and producing a plurality of control signals proportional to the indicating signals. The processor communicates the plurality of control signals to a responding device such a computer having a visual display. The control device further includes a circuit connected to the processor and to the actuator of the transducer for monitoring the capacitance of the actuator wth respect to electrical ground. The circuit cooperates with the processor to operate as an oscillator, which oscillator has a frequency proportional to the capacitance of the actuator with respect to electrical ground. The processor is configured to recognize variance of the frequency beyond a specified excursion and to respond to such a variance by generating a plurality of updated reference control signals and communicating those updated signals to the responding device.

6 Claims, 3 Drawing Figures ically correct with respect to electrical connection between the actuator and the transducer resistive elements, are not precise with respect to the physical movement of the actuator. That is, movement of the actuator in a given direction makes electrical contact with one resistive element of the transducer slightly before similar electrical connection is made with a second axis of the resistive network of the transducer and electrical output is not precisely aligned with physical input applied by the actuator.

ELECTRICAL CONTROL TELEMETERING DEVICE

BACKGROUND OF THE INVENTION

The present invention is directed to an electrical control device for presenting electrical control signals to a responding apparatus, such as a computer, which control signals are produced in response to a force applied to a transducer device contained within the electrical control device. One practical application of such an apparatus as the present invention is a cursor control device for a visual display of a computer. The force transducer contemplated in the present invention is of a type generally similar to that disclosed in U.S. Pat. No. application Ser. No. 455,443 filed Jan. 3, 1983 now U.S. Pat. No. 4,479,392 and assigned to the assignee of the present application. The present invention is designed to overcome some of the shortcomings of the invention of application Ser. No. 455,443 while retaining the advantages of simplicity, reliability, low cost of production, and durability.

SUMMARY OF THE INVENTION

The invention, in its preferred embodiment, is an electrical control device having a transducer generally of the type disclosed in U.S. patent application Ser. No. 455,443 for producing a plurality of indicating signals proportional to axial components of a force applied to that transducer by an actuator, which actuator has a capacitance relative to electrical ground. The control device further includes processor means for receiving the plurality of indicating signals and producing a plurality of control signals proportional to the indicating signals. The processor means, preferably a microprocessor of commercial availability, communicates the plurality of control signals to a responding device such as a computer having a visual display. The control device further includes circuit means connected to the processor means and to the actuator of the transducer for monitoring the capacitance of the actuator with respect to electrical ground. The circuit means cooperates with the processor means to operate as an oscillator, which oscillator has a frequency proportional to the capacitance of the actuator with respect to electrical ground. The processor means is configured to recognize variance of the frequency beyond a specified excursion and to respond to such a variance by generating a plurality of updated reference control signals and communicating those updated signals to the responding device.

This invention is intended, as previously mentioned, to overcome certain shortcomings of the invention of U.S. application Ser. No. 455,443 as it is utilized in a cursor control device in conjunction with a computer having a visual display. There are three basic problems with the transducer which are overcome by this invention:

1. Drift of the cursor in an operator-hands-off condition of the transducer.
2. A dead band; that is, a relatively small range of displacement of the actuator from its zero position for which there is no output signal generated by the transducer. This dead band is generally centered about the no-load, zero position of the actuator.
3. Off-axis response of the transducer. This is a mechanical problem encountered in the transducer which stems from imprecise alignment of the actuator with the resistive elements of the transducer so that output signals generated by the transducer, while electri- Attempts to overcome these shortcomings in the past have included such approaches such as preloading the actuator upon the transducer resistive elements to insure that electrical contact between the actuator and the resistive elements of the transducer is always maintained. While this approach eliminates the dead band in the response of the transducer as well as the off-axis response of the transducer, since in the no-load, zero position electrical trimming and balancing of the transducer circuit can be effected, drift is a problem not overcome by this approach. Drift is a problem even with this approach because only very expensive and precise mechanical zeroing mechanisms could insure that, after operational displacement, the actuator would return precisely to its mechanical zero position thereby, insuring that electrical zero was restored in the afteroperation no-load position of the actuator.

A second approach to solving the above problems involved elimination of preloading of the actuator element against the resistive network of the transducer in order to eliminate drift. Drift was, in fact, eliminated by this approach. However, a dead band was created by this no-preloading approach since the actuator had to be physically displaced at least some minimal distance before electrical connection was made between the actuator and the resistive network of the transducer. Off-axis response was similarly introduced because of imprecise alignment between the actuator and the plane containing the resistive elements of the transducer. Thus, neither of the above approaches solved all three of the above problems.

The present invention, however, solves all three of the above problems. Using a preloading approach, dead band and off-axis response are precluded, as described above. The present invention employs a circuit for determining when a human operator ceases touching the actuator by noting a distinct variance of capacitance, and, upon such an indication, reestablishes the signals then received from the transducer as updated zero-position signals. Thus, drift is eliminated without expensive, complex mechanical centering devices or the like. In addition, the present invention offers further advantages, including automatic compensation of electronic zero in changing environmental conditions such as variations in humidity.

It is therefore an object of this invention to provide an electrical control device with an automatically updated electrical zeroing capability.

A further object of this invention is to provide an electrical control device in which no dead band of actuator movement of a transducer is present.

Still a further object of this invention is to provide an electrical control device which is true in its alignment of electrical response to physical movement of its acuator.

Yet a further object of this invention is to provide an electrical control device which maintains electrical zero in the presence of varying environmental conditions.

Further objects and features of the invention will be apparent from the following specification and claims when considered in connection with the accompanying drawings illustrating the preferred embodiment of the invention.

DETAILED DESCRIPTION OF THE DRAWINGS

DETAILED DESCRIPTION OF THE INVENTION

Figure 1:
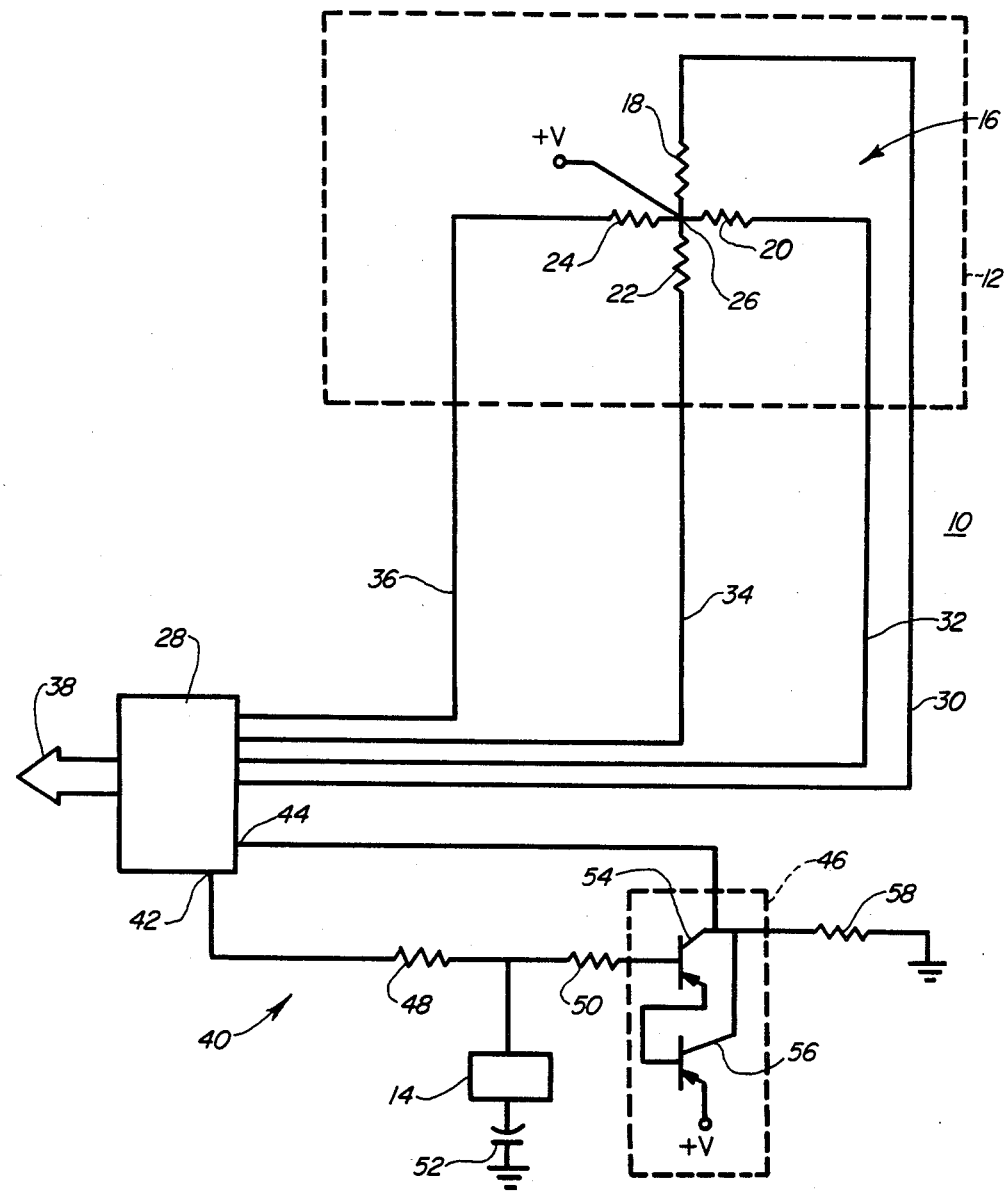
FIG. 1 is a schematic drawing of the preferred embodiment of the present invention.

The preferred embodiment of an electrical control device 10 is shown schematically in FIG. 1. An electrical control device 10 is comprised of a transducer 12 having an actuator 14, shown schematically at the bottom of FIG. 1, and a resistive network 16. The resistive network 16 is comprised of resistors 18, 20, 22 and 24 having a common connection point 26. A voltage is applied to the common connection point 26 and, as disclosed in U.S. patent application Ser. No. 455,443, the actuator is positioned adjacent the resistive network 16 and carries thereon conductive elements (not shown) so that manipulation of the actuator 14 brings selected conductor elements carried thereon into contact with individual resistors 18, 20, 22 and 24 and operates to increasingly shunt current around those resistors with increasing angular displacement of the actuator 14 from its at-rest, zero position. Thus, angular physical translational movement of the actuator 14 results in greater shunting action with respect to the various resistors of the resistive network 16 thereby causing current variations proportional to angular displacement of the actuator 14 in two dimensions. Resistor 18 is connected to a processor unit 28 by line 30. Resistor 20 is connected to the processor unit 28 by line 32. Resistor 22 is connected to the processor unit 28 by line 34. Resistor 24 is connected to the processor unit 28 by line 36. Thus, the transducer 12 provides output signals to the processor unit 28 by output lines 30, 32, 34 and 36. The processor unit 28 is configured to receive the input signals from lines 30, 32, 34 and 36 and to produce control signals proportional to those input signals and to communicate those control signals to a responding device (not shown), such as a computer with a video display, as indicated schematically at 38. A zero adjusting circuit 40 is connected to the processor unit 28 at 42 and 44. The zero adjusting circuit 40 is comprised of an inverter element 46, resistors 48 and 50 and the actuator 14. The actuator 14 has a capacitance to electrical ground, indicated schematically by capacitor 52. The inverter element 46 is comprised of transistors 54 and 56 and ancillary resistor 58.

Operation of the zero adjusting circuit 40 is controlled by the processor unit 28 as follows: Processor unit 28 first places a high or "1" signal at 42 and measures the time required for a "low" or "0" signal to appear at 44. The "0" signal will be forced at 44 because of the inverter circuit 46 within the zero adjusting circuit 40. The time required for appearance of the "0" signal at 44 is dependent upon the RC circuit contained within the zero adjusting circuit 40, which RC circuit is comprised of resistors 48 and 50 and capacitor 52. Thus, since resistors 48 and 50 are fixed in value, the time required for the "0" signal to appear at 44 is directly proportional to the value of capacitor 52. Continuing to describe the operation of the zero adjusting circuit 40 in concert with the processor unit 28, immediately upon sensing the presence of the "0" signal at 44, the processor unit 28 applies a "low" or "0" signal at 42 and measures the time required for a "high" or "1" signal to appear at 44. Thus, the zero adjusting circuit 40, in concert with the processor unit 28, is operated as an oscillator, the frequency of which oscillator is directly proportional to the value of the capacitor 52.

If a human operator, for instance, places his fingers in contact with the actuator 14, the value of capacitor 52 will sharply increase. As a consequence of that sharp increase in capacitance, the frequency of the zero adjusting circuit 40 will vastly decrease since the time required for a signal to traverse the zero adjusting circuit 40 will be greatly increased by the increase in value of capacitor 52. When the human operator releases his touch from the actuator 14, the value of capacitor 52 will sharply decrease, thereby sharply decreasing the time required for a signal to traverse zero adjusting circuit 40, thereby increasing the frequency of oscillation of zero adjusting circuit 40 in concert with processor unit 28. Processor unit 28 is configured to respond to such a sharp drop in the value of capacitor 52, as indicated by a significant decrease in the time required for a signal to traverse zero adjusting circuit 40, by reestablishing electronic zero of the device. That is, upon a precipitous decrease in the value of capacitor 52, as reflected by a sharp decrease in the time required for a signal to traverse zero adjusting circuit 40, processor unit 28 will generate control signals at 38 as zero signals and will reestablish input signals received from the transducer 12 via lines 30, 32, 34 and 36 as zero signals from which all subsequent signals from the transducer 12 are to be measured.

Figure 2:
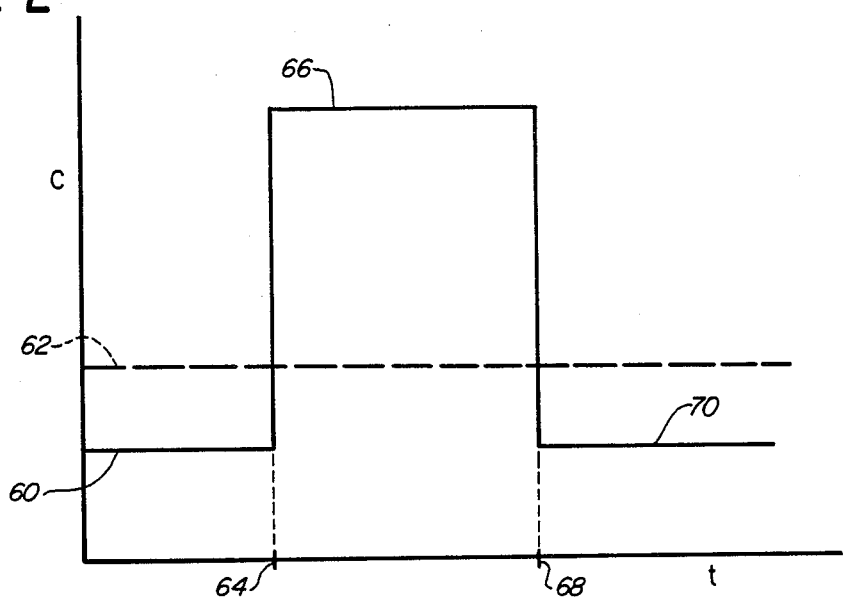
FIG. 2 is a graphic representation of certain electrical perameters within the invention with respect to time.

Referring to FIG. 2, a graphic representation of the value of capacitor 52 with respect to time is shown. The value of capacitor 52 is represented at 60. The processor unit 28 internally establishes a threshold 62. The processor unit 28 is configured to respond only to excursions of capacitance 60 above threshold 62. At time 64 in FIG. 2, a representation is made as to the change of capacitance 60 occasioned by the touching of the actuator 14 in FIG. 1 by a human operator's finger, raising the value of the capacitance of capacitor 52 to a level 66. Upon removal of the human operator's finger at time 68, the capacitance of capacitor 52 returns precipitously to a level 70 substantially equal to the level 60. The processor unit 28 is configured to respond to such a precipitous drop as is illustrated in FIG. 2 at time 68 to communicate a zero control signal at 38 in FIG. 1 and to reestablish the input signals from the transducer 12 received by the processor unit 28 on lines 30, 32, 34 and 36 as updated zero values from which excursions of input signals from the transducer 12 will subsequently be measured. The processor unit 28 is further configured to ignore excursions of capacitance 60 in FIG. 2 which do not exceed the threshold established internally within the processor unit 28, as at 62 in FIG. 2.

Figure 3:
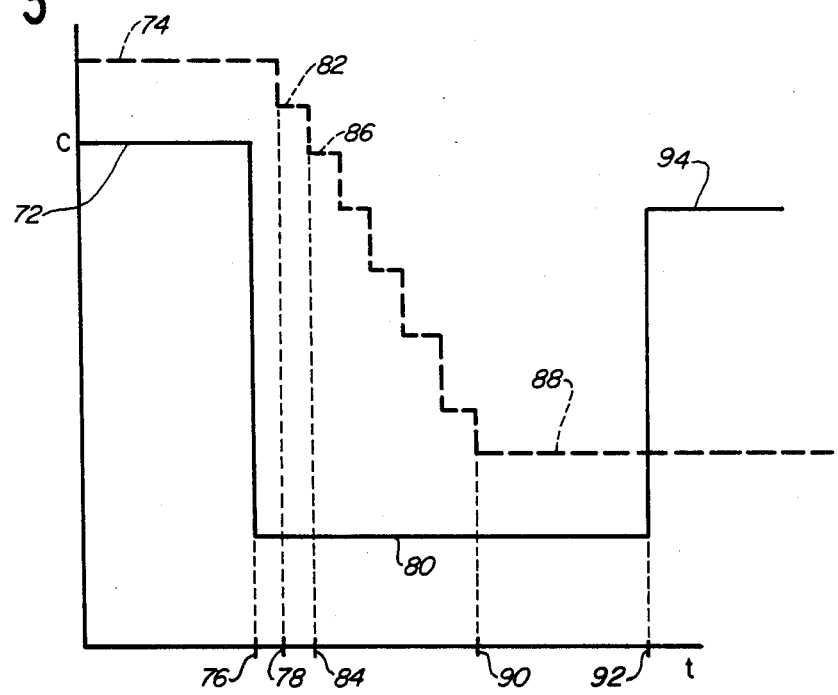
FIG. 3 is a graphic representation of certain electrical perameters within the invention with respect to time illustrating the step wise normalization feature of the present invention.

Referring to FIG. 3, a graphic representation of capacitance of capacitor 52 with respect to time is presented in a manner illustrating a feature of the present invention not heretofore addressed. The feature is a step-wise normalizing feature incorporated within the configuration of the processor unit 28 to preclude response of the zero adjusting circuit 40 to spurious or transient stimulii. The step-wise normalizing approach incorporated in the present invention is accomplished by limiting excursion of the threshold established internally by the processor unit 28 to a specified quantum per a specified period of time so that spurious or transient stimulii will not cause wide swinging variations in that threshold and, consequently, in the response of the zero adjusting circuit 40. FIG. 3 specifically illustrates, by way of example, a situation where the control device is energized while a human operator has physical contact with the actuator 14 of FIG. 1. Thus, the initial value of capacitor 52 is high as at 72 in FIG. 3. The processor unit 28 is configured to establish the capacitance of capacitor 52 as a zero reference point upon initial energization of the electrical control device of the present invention. Therefore, an initial threshold 74 is established upon energization of the device as illustrated in FIG. 3. If a human operator subsequently removes his touch from the actuator 14, as at time 76 in FIG. 3, excursion of the threshold 74 is delayed until time 78 to insure that the precipitous decline in capacitance which occurred at time 76 is not merely a transient excursion. At time 78, the threshold is then adjusted toward the new value of capacitance 80, but only by a specified quantum to level 82. The threshold value is held by the processor unit 28 at a level 82 for a specified period of time until time 84, at which time 84 the threshold value is subsequently adjusted toward capacitance value 80 to a second new level 86, and the threshold is thus stepwise adjusted downward by specified quantums over specified periods of time until a final revised threshold value 88 is established in correct relation with new capacitance value 80 at time 90.

FIG. 3 further illustrates another feature of this aspect of the invention in that a precipitous rise of capacitance value 80, as at time 92, to capacitance value 94 does not affect the threshold value 88 in the processor unit 28. This is because the processor unit 28 is configured to interpret precipitous rises in capacitance value as a touch of the actuator 14 in FIG. 1 by a human operator and to respond to such a situation as was illustrated by FIG. 2. A slow rise of capacitance, however, is recognized by the processor unit 28 as an environmental change and would trigger a step-wise adjustment of the threshold upward to maintain a specified value difference between the non-touch capacitance value, as at 80 in FIG. 3, and the threshold, as at 88 in FIG. 3. Thus, the step-wise normalization feature adjusts for environmental changes. Humidity is one significant environmental factor in that an increase in humidity has the effect of increasing leakage of a capacitor and thus presenting an apparent lowering of capacitance value, which change in apparent capacitance value of the actuator 14 of FIG. 1 would be automatically compensated by this feature of step-wise normalization.

It is to be understood that, while the detailed drawings and specific examples given describe preferred embodiments of the invention, they are for the purpose of illustration only, that the apparatus of the invention is not limited to the precise details and conditions disclosed and that various changes may be made therein without departing from the spirit of the invention which is defined by the following claims.

I claim:

1. An electrical control device comprising resistive means for simulation of at least one axis; actuator means associated with said resistive means for effecting control indication, said actuator means having a capacitance to ground; processor means connected to said resistive means and receiving an output therefrom, said processor means responding to said output to produce a control signal and communicating said control signal to a responding device; and circuit means for indicating an occasion for updating a reference level of the control device; said circuit means being connected to said processor means and to said actuator means, said circuit means cooperating with said processor means to oscillate at a frequency, said frequency being proportional to said capacitance; said processor means responding to a specified variance of said frequency as an indication of said occasion by communicating a reference control signal to said responding device upon occurrence of said occasion and by establishing said reference control signal as a reference level for subsequent of said control signals communicated to said responding device.

2. An electrical control device as recited in claim 1 wherein said communication of a reference control signal is effected in a step-wise manner limiting excursion of said control signal to said reference control signal to a specified quantum for a specified period of time whereby precipitous variation of said control signal in response to spurious or transient stimulii is precluded.

3. An electrical control device comprising transducer means for producing an indicating signal proportional to a force applied thereto; actuator means for applying said force, said actuator means having a capacitance relative to electrical ground; processor means for receiving said indicating signal and producing a control signal, said control signal having a mathematical relation to said indicating signal, said processor means communicating said control signal to a responding device; and circuit means connected to said processor means and said actuator means for monitoring said capacitance; said circuit means cooperating with said processor means to operate as an oscillator having a frequency proportional to said capacitance; said processor means being configured to recognize an occurrence of a specified variance of said frequency and to respond to said specified variance by generating an updated reference control signal for communication to said responding device by applying said mathematical relation to said indicating signal received by said processor means at said occurrence of said specified variance.

4. An electrical control device as recited in claim 3 wherein said processor means is further configured to effect said generating of said updated reference control signal in a step-wise manner over a period of time whereby excursion of said control signal toward said updated reference control signal is limited to a specified quantum per specified time period, thereby precluding precipitous variations of said control signal in response to spurious or transient stimulii.

5. An electrical control device comprising transducer means for producing a plurality of indicating signals proportional to axial components of a force applied to said transducer means; actuator means for applying said force in a plurality of axes, said actuator means having a capacitance relative to electrical ground; processor means for receiving said plurality of indicating signals and producing a plurality of control signals, said plurality of control signals each having a mathematical relation to a respective one of said plurality of indicating signals, said processor means communicating said plurality of control signals to a responding device; and circuit means connected to said processor means and, said actuator means for monitoring said capacitance; said circuit means cooperating with said processor means to operate as an oscillator having a frequency proportional to said capacitance; said processor means being configured to recognize an occurrence of a specified variance of said frequency and to respond to said specified variance by generating a plurality of updated reference control signals for communication to said responding device by applying said mathematical relation to said plurality of indicating signals received by said processor means at said occurrence of said specified variance.

6. An electrical control device as recited in claim 5 wherein said generation of said plurality of updated reference control signals is effected in a step-wise manner limiting excursion of said plurality of control signals to said plurality of updated reference control signals to a specified quantum per a specified period of time whereby precipitous variation of said plurality of control signals in response to spurious or transient stimulii is precluded.

* * * * *